United States Patent [19]
Fulgenzi et al.

[11] Patent Number: 5,524,962
[45] Date of Patent: Jun. 11, 1996

[54] TILT FORWARD SEAT BASE FOR INTEGRATED INFANT SEAT

[75] Inventors: Lynda K. Fulgenzi, Dearborn Heights; Roger P. Daniel, Dearborn; Heather M. Loftus, Clawson, all of Mich.

[73] Assignee: Ford Motor Company, Dearborn, Mich.

[21] Appl. No.: 216,705

[22] Filed: Mar. 23, 1994

[51] Int. Cl.[6] .................................................. A47C 15/00
[52] U.S. Cl. ........................ 297/237; 297/236; 297/238
[58] Field of Search ................................. 297/236, 237, 297/238

[56] References Cited

U.S. PATENT DOCUMENTS

| | | | |
|---|---|---|---|
| 4,533,176 | 8/1985 | Wyttenbach | 297/238 |
| 4,555,135 | 11/1985 | Freeland . | |
| 4,596,420 | 6/1986 | Vaidya | 297/238 X |
| 4,664,443 | 5/1987 | Casale | 297/238 |
| 4,756,573 | 7/1988 | Simin et al. | 297/238 X |
| 4,768,827 | 9/1988 | Musgrove | 297/236 |
| 4,936,627 | 6/1990 | Guin | 297/238 |
| 4,986,603 | 1/1991 | Hanai et al. | 297/238 X |
| 5,035,465 | 7/1991 | Hanai et al. | 297/238 |
| 5,106,158 | 4/1992 | Dukatz et al. | 297/238 X |
| 5,121,964 | 6/1992 | Fourrey et al. . | |

FOREIGN PATENT DOCUMENTS

| | | | |
|---|---|---|---|
| 0516495 | 5/1991 | European Pat. Off. . | |
| 2823529 | 12/1979 | Germany . | |
| 3800896 | 9/1988 | Germany | 297/237 |
| 59-156837 | 9/1984 | Japan . | |

Primary Examiner—Peter M. Cuomo
Assistant Examiner—Rodney B. White
Attorney, Agent, or Firm—Gregory P. Brown; Roger L. May

[57] ABSTRACT

An integrated infant seat apparatus is described for a primary seat in a motor vehicle. The infant seating apparatus includes an infant seat cushion, an infant seat back and an overhead guide attached to an upper end of the infant seat back substantially perpendicular to the infant seat back. The infant seat is disposed on a tilting infant seat base, adapted to orient the overhead guide with an instrument panel mounted airbag, enabling the guide to direct the inflation of an airbag into the passenger compartment over the infant seat.

15 Claims, 4 Drawing Sheets

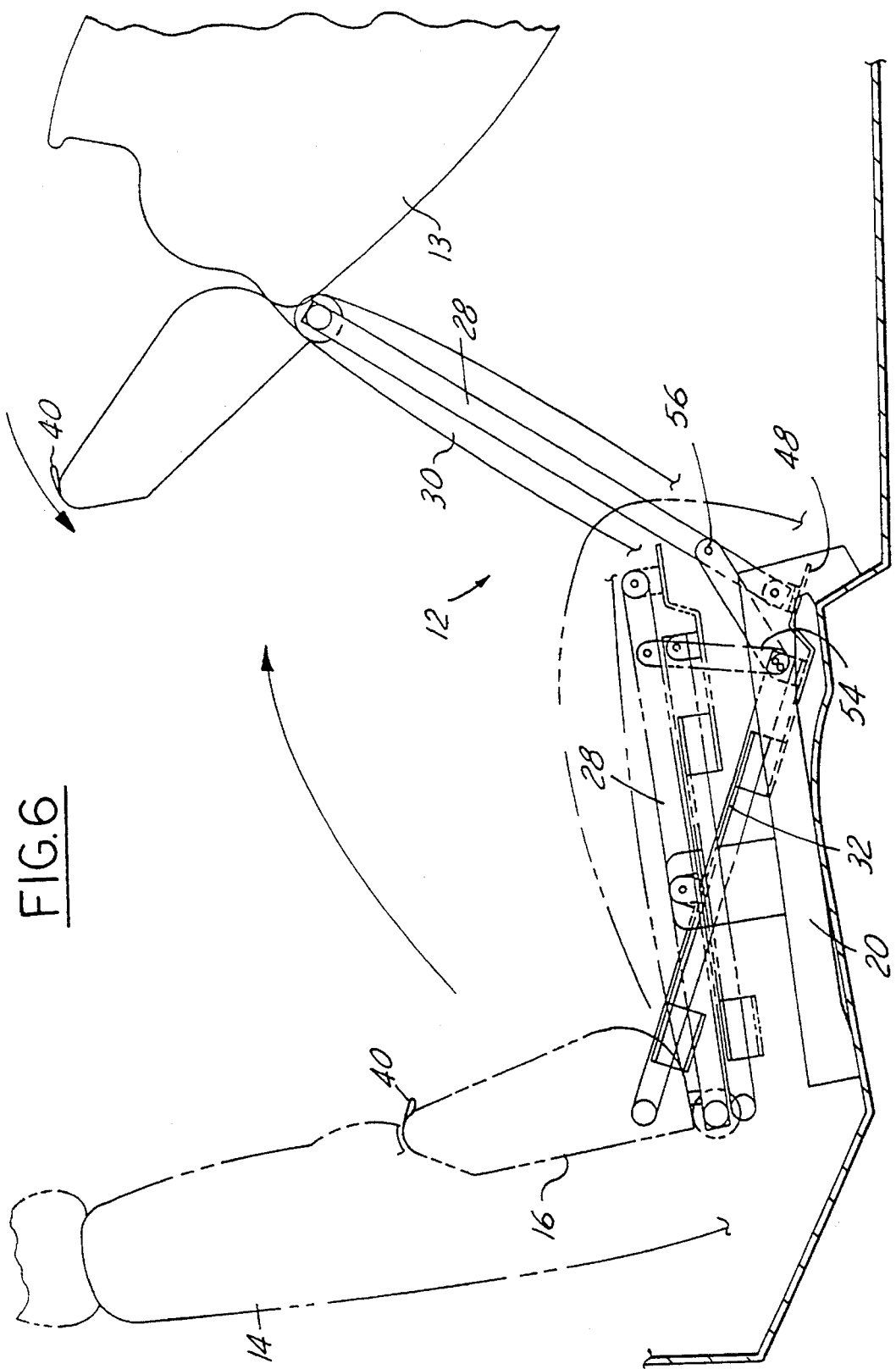

5,524,962

TILT FORWARD SEAT BASE FOR INTEGRATED INFANT SEAT

BACKGROUND OF THE INVENTION

1. Field of the Invention

The present invention relates to infant seats for motor vehicles. More particularly, the present invention relates to an infant seat that is integrated within a passenger seat which tilts forward upon opening the infant seat.

2. Disclosure Information

Specialized infant seating systems for restraining infants in motor vehicles are well known. These devices generally take the form of cradle-like structural housings which may be secured on top of a sitting surface of a conventional primary seat. The present invention improves these well-known infant seating systems by providing an infant seat integrated within a primary seat thereby increasing the convenience and ease of use associated with infant seats.

U.S. Pat. No. 4,555,135 issued to Freeland and European Patent No. 516495 issued to Rena represent improvements to infant seating systems by providing an infant seat which may be stored within the sitting surface of a primary seat. Freeland teaches the concept of hingedly fixing the infant seat back and primary seat cushion element to the forward edge of the primary seat. Rena shows an alternative design in which the integrated infant seat slides out of the primary seat cushion on an arcuate track. More particularly, Rena's infant seat includes a part of the primary seat cushion that pivots upward to form an infant headrest and another part that pivots downward to form an infant seat. Neither of these integrated infant seats provides a primary seat base mechanism for tilting the infant seat forward to lower the infant seat back relative to the instrument panel.

It would be desirable to provide a primary seat base mechanism for forwardly tilting, thereby lowering an infant seat relative to the instrument panel.

SUMMARY OF THE INVENTION

The present invention advances beyond the systems described above by providing an infant seating apparatus for use in a passenger compartment of a motor vehicle including an instrument panel having an airbag disposed therein and a primary seat base securely disposed within the passenger compartment having a first edge. The infant seating apparatus further includes an infant seat base having a forward end adjacent to the first edge of the primary seat base and a rearward end opposite therefrom. The infant seat base is pivotally fastened to the primary seat base between the forward end and the rearward end. The infant seating apparatus further includes a planar member pivotally fastened to the forward end of the infant seat base and terminating at a first end such that the planar member is rotatable upward from the infant seat base to an open position. The infant seating apparatus further includes a tilt device disposed between the planar member and the primary seat base for tilting the infant seat base such that the forward end thereof moves downward as the planar member is pivoted upward from a stored position to an open position, thereby lowering the first end of the planar member in the open position below the airbag in the instrument panel.

It is an advantage of the present invention to provide an infant seating system capable of directing an inflating airbag above the infant seat.

Other objects, features and advantages of the present invention will become apparent to those skilled in the art from the drawings, detailed description and claims which follow.

BRIEF DESCRIPTION OF THE DRAWINGS

FIG. 6 is an elevational view of an integrated infant seat frame according to the present invention illustrating the articulation from a closed position to an open position.

DESCRIPTION OF THE PREFERRED EMBODIMENTS

Figure 1:
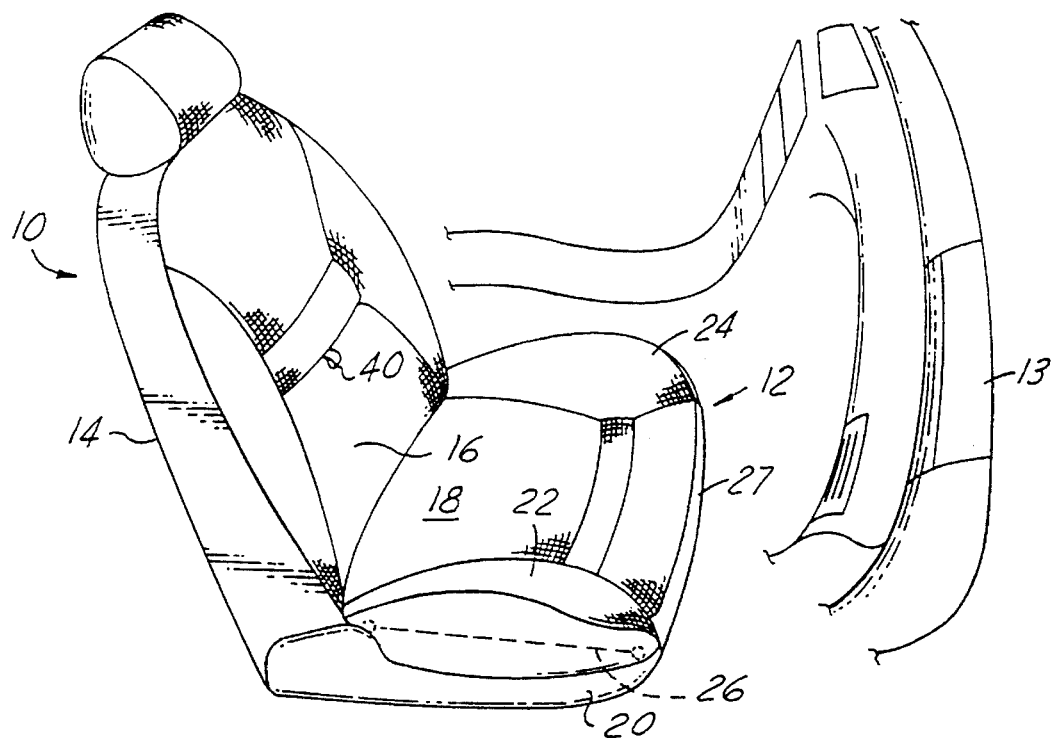
FIG. 1 is a perspective view of a primary seat according to the present invention illustrating an integrated infant seat in a stored position.

Referring now to the Figures, FIG. 1 illustrates a passenger compartment of a motor vehicle having a primary seat 10 including an integrated infant seat 12 stored to permit conventional passenger seating. For purposes of this description, a primary seat is one that is designed for all passengers not requiring supplemental seating devices, such as infants. A passenger seated in the primary seat 10 faces an instrument panel 13 that includes a supplemental restraint device, such as an airbag.

The primary seat 10 includes a primary seat back 14 having a lumbar support portion 16 disposed in a lower portion of the primary seat back 14. The primary seat 10 further includes a horizontally disposed primary seat cushion 18 disposed on a primary seat base 20. Elongate bolsters 22, 24 flank the right and left sides of the primary seat cushion 18 and are attached to primary seat base 20. The elongate bolsters 22, 24 optionally include a hinge mechanism 26 and a spring (not shown) for urging the elongate bolsters 22, 24 into a predetermined position.

Figure 2:
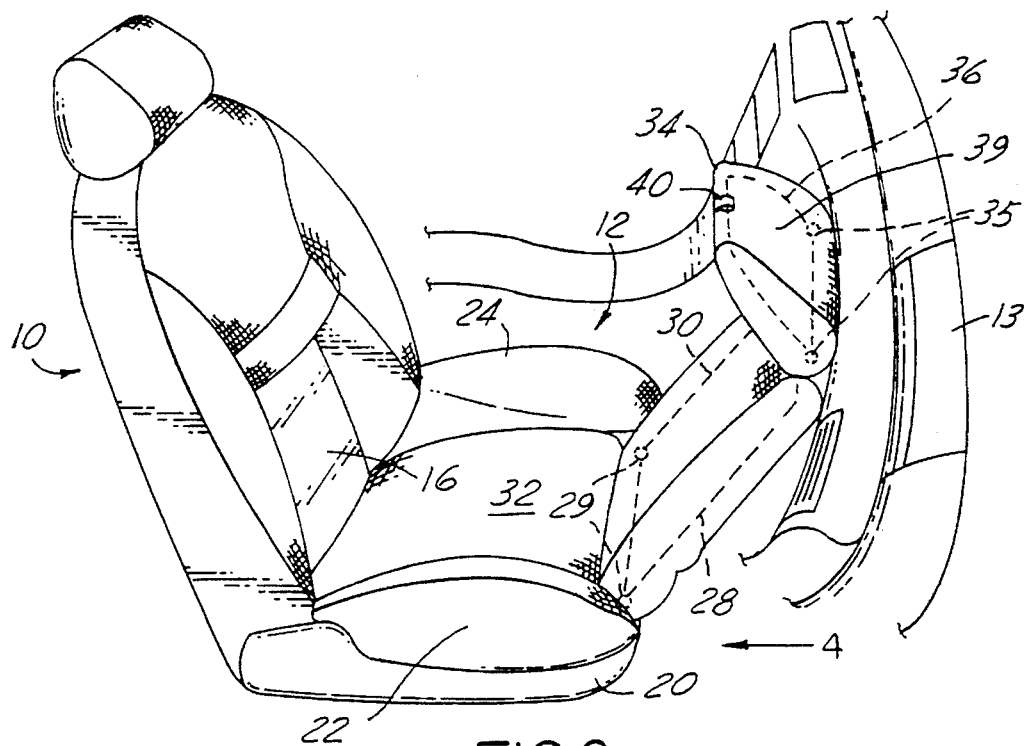
FIG. 2 is a perspective view of a primary seat according to the present invention illustrating an integrated infant seat opened for use.

FIG. 2 illustrates the infant seat 12 in a open position for infant seating. The infant seat 12 includes an infant seat cushion 32 disposed above the primary seat base 20 and an infant seat back 30 pivotally attached to the first edge of the infant seat cushion 32 by a first pivotable fastener 29. In the preferred embodiment, the infant seat 12 also includes an overhead guide 34 pivotally attached to the first end of the infant seat back 30.

Figure 3:
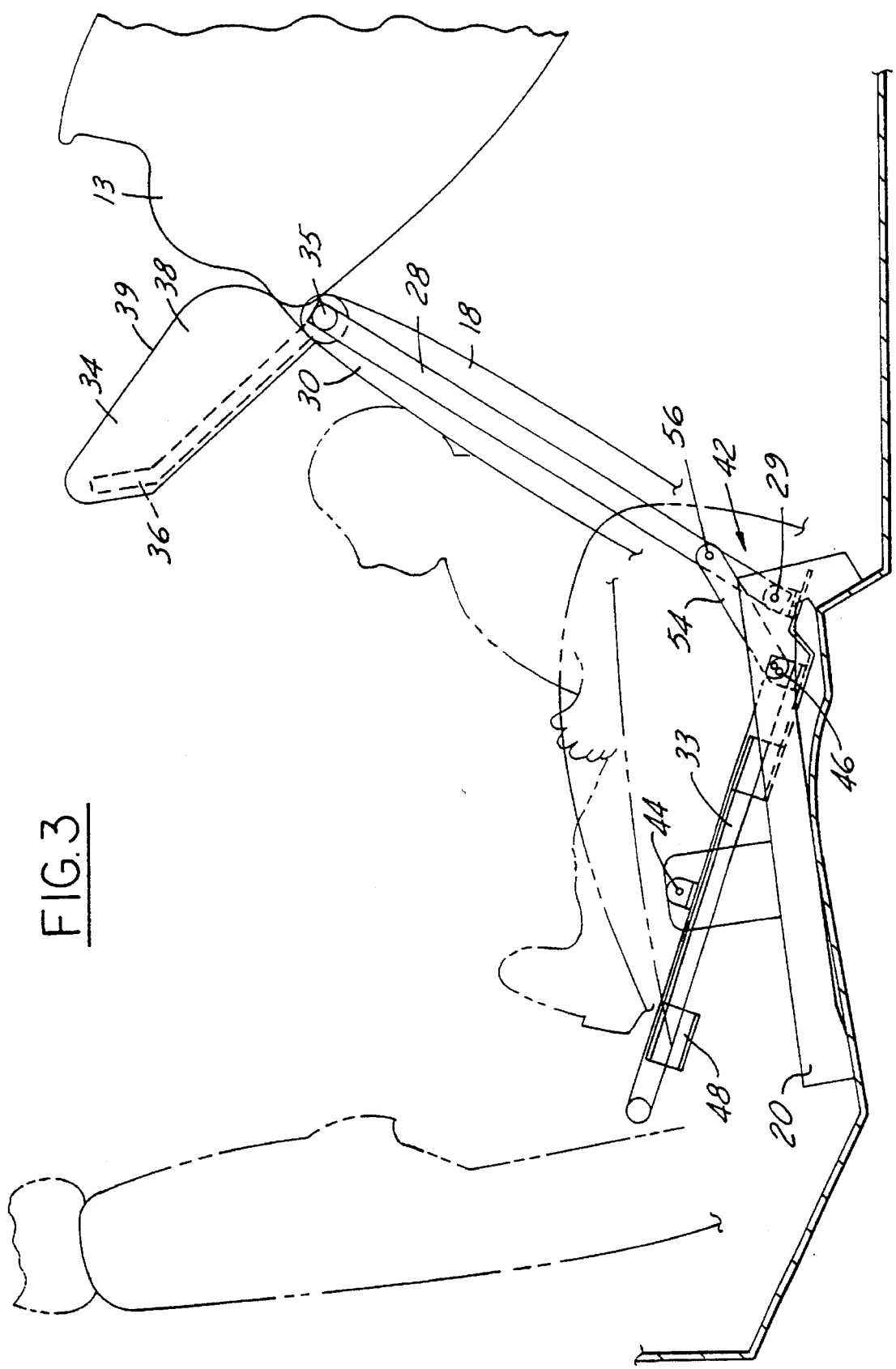
FIG. 3 is an elevational view of a primary seat according to the present invention illustrating an integrated infant seat opened and tilted forward into the lowered infant seating position for use.

Referring to FIG. 3, one side of the guide 34 has an airbag directing surface 39, which is adapted to be oriented in a predetermined position to provide a low contact angle with an inflating airbag when the infant seat 12 is in the open position. The airbag directing surface 39 of the guide 34 also includes a lumbar cushion 38, such that when the infant seat 12 is in the stored position the guide 34 fits in the lower portion of the primary seat back 14 to provide comfortable lumbar support.

A second pivotable fastener 35 permits the guide to rotate from the stored position to the predetermined open position. Engagement means (not shown) on the second pivotable fastener 35 prevents further rotation of the guide 34 relative to the infant seat back 30. The engagement means may comprise a simple tab that abuts against a fixed flange or another grounded tab, or alternatively, a complex button operated tongue and notch arrangement can be provided to permit adjustment of the contact angle between the guide 34 and the airbag within the instrument panel 13.

FIG. 3 also illustrates the primary seat cushion 18 and the infant seat back 30 covering first and second faces, respectively, of a planar member 28. The planar member 28 is a substantially rigid structural member. The primary seat cushion 18 and the infant seat back 30 may be glued or otherwise suspended from the planar member 28, either method being commonly known to those skilled in the seating arts.

Figure 4:
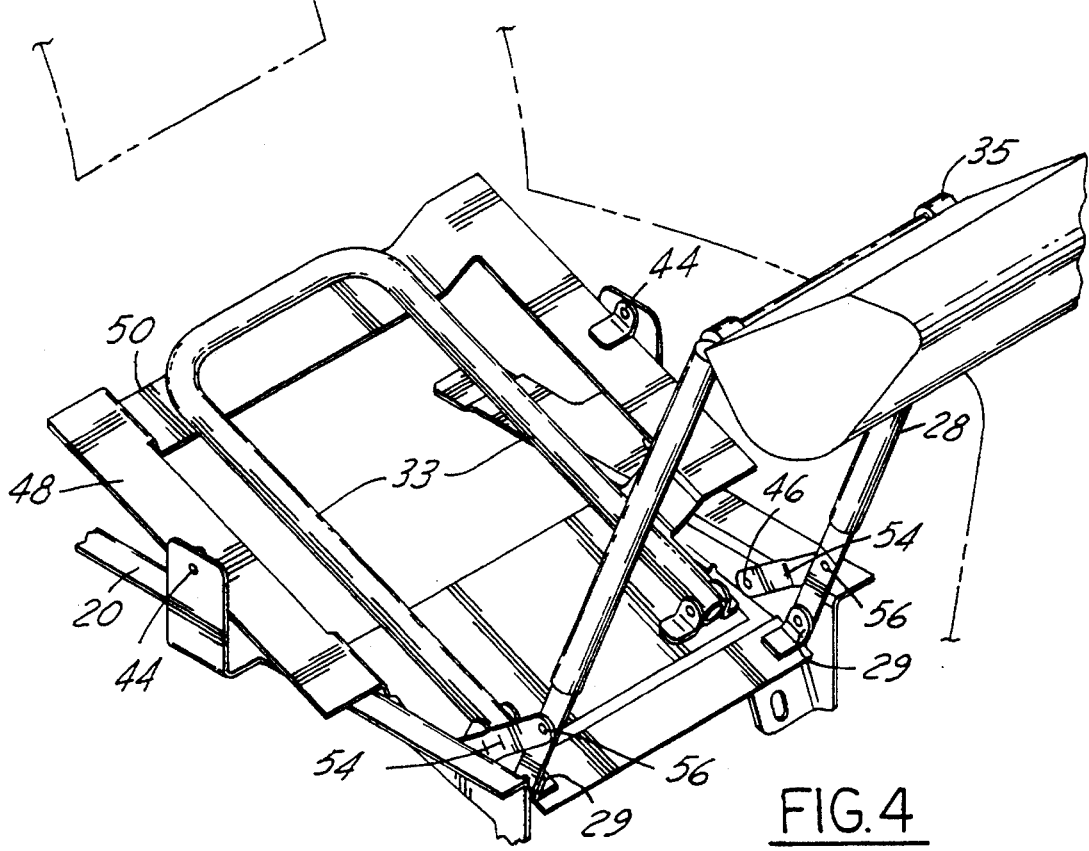
FIG. 4 is a perspective view of an integrated infant seat according to the present invention illustrating the infant seat frame of an integrated infant seat tilted into the lowered open position for use.

As can be seen in FIGS. 3 and 4, the infant seat cushion 32 may simply comprise a fabric material stretched between infant seat cushion frame 33. This simple inexpensive construction suspends the weight of an infant while providing elasticity necessary to comfortably conform to the infants weight. The present invention is not limited to this form of seat suspension, as alternative seat suspensions are commonly known to those skilled in the seating arts, which would provide equivalent functionality and operability.

Figure 5:
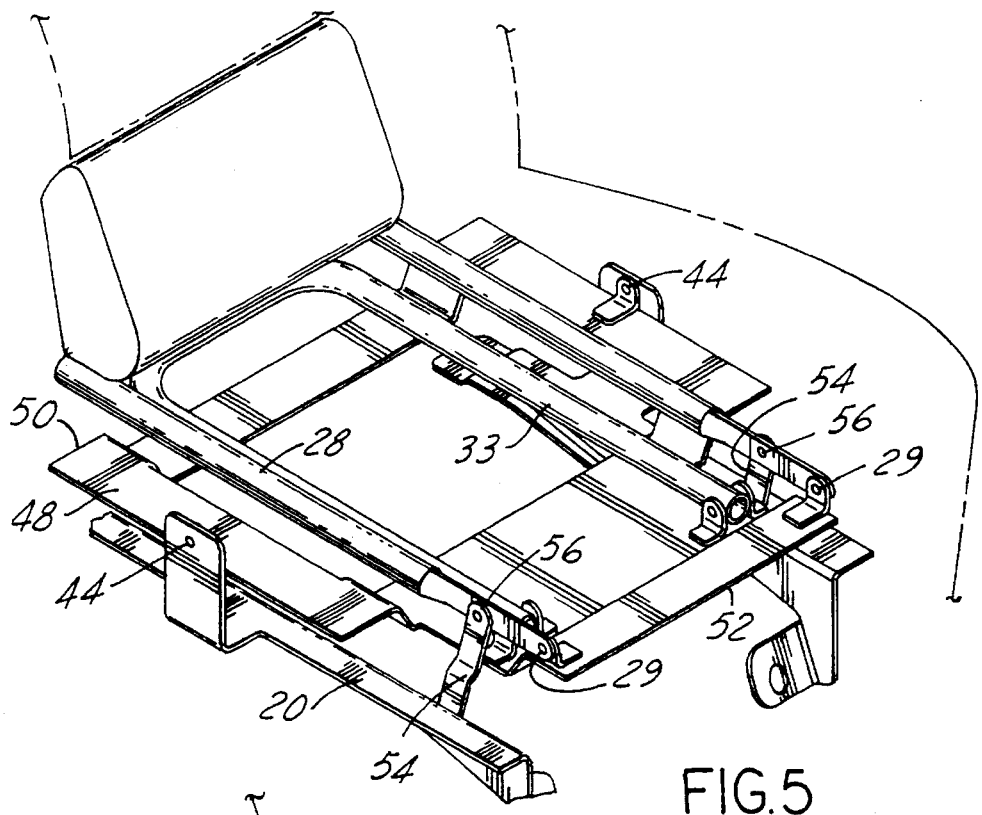
FIG. 5 is a perspective view of an integrated infant seat according to the present invention illustrating the infant seat frame in the stored position.

Referring to FIGS. 3, 4 and 5 the infant seat 12 is disposed on top of a tilt forward mechanism 42. For clarity, only one side of the tilt forward mechanism 42 will be described, it being understood that the right and left side are equal but symmetrically opposite. The tilt forward mechanism 42 includes an infant seat base 48 pivotally interconnected to the primary seat base 20. The infant seat base 48 has a rearward end 50 near the primary seat back 14 and a forward end 52 nearest the first pivotable fastener 29. The infant seat base 48 pivotally attaches to the primary seat base 20 substantially midway between the forward end 52 and the rearward end 50 with a third pivotable fastener 44. The exact location of the third pivotable fastener 44 is a function of the amount of tilting desired for the particular design. The infant seat base 48 is narrower than the primary seat base 20, allowing the infant seat base 48 to tilt between the longitudinal members of the primary seat base 20.

The first pivotable fastener 29 interconnects planar member 28 to the forward end of the infant seat base 48. A link 54 pivotally interconnects the planar member to the primary seat base 20. A fourth pivotable fastener 46 interconnects the link 54 to the primary seat base 20, and a fifth pivotable fastener 56 interconnects the opposite end of the link 54 to the planar member 28 adjacent to the first pivotable fastener 29. The length and location of the attachment points of link 54 determine the planar member 28 angle in the open position and magnitude of the tilt angle.

In the preferred embodiment, the seat base 20 consists of a frame (not shown) disposed on top of a conventional seat track mechanism (not shown) for fore and aft adjustment of the primary seat within the passenger compartment. The stationary portion of the seat track mechanism is securely fastened to the coachwork of the motor vehicle.

Referring to FIG. 6, use of the infant seat 12 is as simple as pulling the guide 34 out of the lumbar portion of the seat back 14. A tab 40 may be provided to facilitate gripping of the guide 34 when it is stored in the lumbar support portion 16 of the primary seat back 14. Pulling the planar member 28 upward from the stored position to the deployed position exposes both the infant seat cushion 32 and the infant seat back 30. As the planar member 28 rotates toward the instrument panel 13, link 54 urges downward on the planar member 28 at the fifth pivotable member 56, causing the forward end of the infant seat base 48 to tilt downward. At a predetermined position, link 54 kinematically locks the infant seat into the deployed or open position. This establishes the proper infant seat back angle and height, which permits the guide to properly interact with an inflating airbag.

Simultaneously or sequentially, guide 34 rotates into its predetermined airbag directing position substantially perpendicular to the infant seat back 30. The relationship between the guide 34, and the airbag within the instrument panel 13 dictates the final orientation of the guide 34. The guide 34 projects rearward toward the primary seat back 14, over the infant seat cushion 32. In this position, the guide is best oriented for properly directing the inflation of the airbag and blocking the infant from bright sunlight. Although not shown in the Figures, a three or five point infant seat belt device restrains the infant within the infant seat 12.

The operator returns the infant seat to the stored position in the reverse order of the steps above. Simply releasing and rotating the planar member 28 downward toward the seat base 20, causes link 54 to urge downward on the primary seat base 20, thereby forcing the infant seat base 48 upward into the primary seating position. Similarly, the guide 34 may be rotated into the lumbar support portion 16 of the primary seat back 14 to complete stowing the infant seat.

Various other modifications and permutations of the present invention, no doubt, will occur to those skilled in the art. For example, in an electrically powered primary seat, the fore and aft positioning of the primary seat may automatically be adjusted to a predetermined location upon opening the infant seat. Additionally, the kinematic mechanism could be electronically driven. Yet another variation would be to allow the primary passenger seat to have an aftermarket infant seat receiver. This would operate in an identical manner, but rather than presenting a child seat when opened, this presents a receiver for securely accepting an aftermarket infant seat in the preferred lower position. Therefore, it is the following claims, including all equivalents, which define the scope of the present invention.

We claim:

1. A passenger seating apparatus for use in a passenger compartment of a motor vehicle including an instrument panel having an airbag disposed therein, said passenger seating apparatus comprising:

a primary seat base securely disposed within the passenger compartment and having a first edge;

an infant seat base having a forward end adjacent to said first edge of said primary seat base and a rearward end opposite therefrom, said infant seat base being pivotally fastened to said primary seat base between said forward end and said rearward end;

a planar member pivotally fastened to said forward end of said infant seat base and terminating at a first end such that said planar member is rotatable upward from said infant seat base to an open position; and tilt means disposed between said planar member and said primary seat base for tilting said infant seat base such that said forward end thereof moves downward as said planar member is pivoted upward from a stored position to an open position, thereby lowering said first end of said planar member in the open position below the airbag in the instrument panel.

2. A passenger seating apparatus according to claim 1, wherein said planar member is substantially rigid.

3. A passenger seating apparatus according to claim 1, wherein said infant seat base is pivotally fastened substantially midway between said forward end and said rearward end to said primary seat base.

4. A passenger seating apparatus according to claim 1, wherein said tilt means is pivotally fastened between said planar member and said primary seat base.

5. A passenger seating apparatus according to claim 1, wherein said infant seat base is substantially coplanar with said planar member before said planar member is rotated to the open position.

6. A passenger seating apparatus for use in a passenger compartment of a motor vehicle including an instrument panel having an airbag disposed therein, said passenger seating apparatus comprising:

a primary seat base securely disposed within the passenger compartment and having a first edge;

an infant seat base having a forward end adjacent to said first edge of said primary seat base and a rearward end opposite therefrom, said infant seat base being pivotally fastened between said forward end and said rearward end to said primary seat base;

a planar member pivotally fastened to said forward end of said infant seat base and terminating at a first end such that said planar member is rotatable upward from said infant seat base to an open position; and a link pivotally fastened between said planar member and said first edge of said primary seat base, said link being operative to urge said forward end of said infant seat base downward as said planar member is pivoted upward from a stored position to said open position, thereby lowering said first end of said planar member in the open position below the airbag in the instrument panel.

7. A passenger seating apparatus according to claim 6, wherein said planar member is substantially rigid.

8. A passenger apparatus according to claim 6, wherein said infant seat base is pivotally fastened substantially midway between said forward end and said rearward end to said primary seat base.

9. A passenger seating apparatus according to claim 6, wherein said infant seat base is substantially coplanar with said planar member before said planar member is rotated to the open position.

10. A passenger seating apparatus for use in a passenger compartment of a motor vehicle including an instrument panel having an airbag disposed therein, and having an infant seat integrated within a primary seat of a motor vehicle, said passenger seating apparatus comprising:

a primary seat base securely disposed within said passenger compartment and having a first edge;

a primary seat back mounted to said primary seat base opposite said first edge and having a lumbar portion adjacent to said primary seat base;

an infant seat base having a forward end and a rearward end;

an infant seat cushion frame disposed on said infant seat base;

an infant seat cushion disposed on said infant seat cushion frame;

a planar member extending from said forward end of said infant seat base and terminating at a first end of said planar member, said planar member further defining a primary seat cushion on one side thereof and an infant seat back on an opposite side thereof;

a first pivotable fastener interconnecting said forward end of said infant seat base and said planar member such that said planar member rotates from a closed position upward, away from said infant seat cushion to an open position;

a guide extending from said first end of said planar member such that when said planar member is in said open position, said guide is substantially perpendicular thereto, projecting toward said primary seat back, over said infant seat cushion, said guide being adapted to direct the airbag above the infant seat when in said open position;

a second pivotable fastener interconnecting said guide to said first end of said planar member, said second pivotable fastener operative to adjust said guide from said lumbar portion of said primary seat back in said stored position to said open position;

a link pivotally interposed between said planar member and said first edge of said primary seat base;

a third pivotable fastener interconnecting said primary seat base to said infant seat base substantially midway between said forward end and said rearward end;

a fourth pivotable fastener connecting said link to said primary seat base;

a fifth pivotable fastener opposite said fourth pivotable fastener connecting said link to said planar member, said third, fourth and fifth pivotable fasteners together with said link being operative to urge said forward end of said infant seat base downward as said planar member is pivoted upward from said stored position to said open position, thereby lowering said first end of said planar member in the open position below the airbag in the instrument panel.

11. A passenger seating apparatus according to claim 10, wherein said second pivotable fastener is further operative to adjust a contact angle between said guide and said airbag.

12. A passenger seating apparatus according to claim 10, wherein said planar member substantially rigid.

13. A passenger seating apparatus according to claim 10, wherein said infant seat base is pivotally fastened substantially midway between said forward end and said rearward end to said primary seat base.

14. A passenger seating apparatus according to claim 10, wherein said tilt means is pivotally fastened said planar member and said primary seat base.

15. A passenger seating apparatus according to claim 10, wherein said infant seat base is substantially coplanar with said planar member before said planar member is rotated to the open position.

* * * * *